United States Patent [19]

Sakoh

[11] Patent Number: 5,416,885
[45] Date of Patent: May 16, 1995

[54] SPEED CONTROL DEVICE FOR DC MOTOR

[75] Inventor: Masahiko Sakoh, Anjo, Japan

[73] Assignee: Makita Corporation, Anjo, Japan

[21] Appl. No.: 77,748

[22] Filed: Jun. 18, 1993

[30] Foreign Application Priority Data

Jun. 26, 1992 [JP] Japan .................................. 4-193496

[51] Int. Cl.⁶ .......................................... H02P 7/288
[52] U.S. Cl. .................................... 388/838; 388/937; 318/650
[58] Field of Search ................. 388/838, 937; 318/11, 318/650

[56] References Cited

U.S. PATENT DOCUMENTS

| | | |
|---|---|---|
| 3,916,272 | 10/1975 | Grunleitner et al. . |
| 3,988,656 | 10/1976 | Schnizler, Jr. et al. ............ 318/345 |
| 4,078,194 | 3/1978 | Johnson, Jr. . |
| 4,132,933 | 1/1979 | Barcz et al. ......................... 318/346 |
| 4,283,666 | 8/1981 | Kemmel ............................. 318/349 |
| 4,291,259 | 9/1981 | Marumoto et al. . |
| 4,458,183 | 7/1984 | Neilson . |
| 4,481,448 | 11/1984 | Bishop . |
| 4,527,101 | 7/1985 | Zavis et al. . |
| 4,873,453 | 10/1989 | Schmerda et al. . |
| 4,903,318 | 2/1990 | Nagata ................................ 388/937 |
| 4,949,393 | 8/1990 | Ohmori et al. ..................... 388/815 |
| 4,995,094 | 2/1991 | Aio . |

FOREIGN PATENT DOCUMENTS

395401 10/1990 European Pat. Off. .

Primary Examiner—William M. Shoop, Jr.
Assistant Examiner—Karen Masih
Attorney, Agent, or Firm—Dennison, Meserole, Pollack & Scheiner

[57] ABSTRACT

A speed control device for a DC motor controls the rotational speed of the DC motor through adjustment of a duty cycle of a semiconductor switching element. The rotational speed to be obtained is determined by an amount of operation of an operation member. A second contact switch is arranged to bypass the semiconductor switching element and is turned on to eliminate influence of the internal resistance of the semiconductor switching element. A power source contact switch is provided between a power source and the DC motor and is turned on and off through operation of the operation member. A switch-on forcing signal generation circuit and a switch-off forcing signal generation circuit are provided to forcibly switching on and off the second contact switch and the power source contact switch immediately before turning on and off thereof, respectively, so that the second contact switch may not be turned on and off when the semiconductor switching element is off and that the power source contact switch may not be turned off when the semiconductor switching element is on.

8 Claims, 7 Drawing Sheets

PRIOR ART

SPEED CONTROL DEVICE FOR DC MOTOR

BACKGROUND OF THE INVENTION

1. Field of the Invention

The present invention relates to a speed control device for a DC motor, and more particularly to a speed control device for a DC motor having an operation member operable by an operator to adjust the rotational speed of the DC motor.

2. Description of the Prior Art

Figure 5:
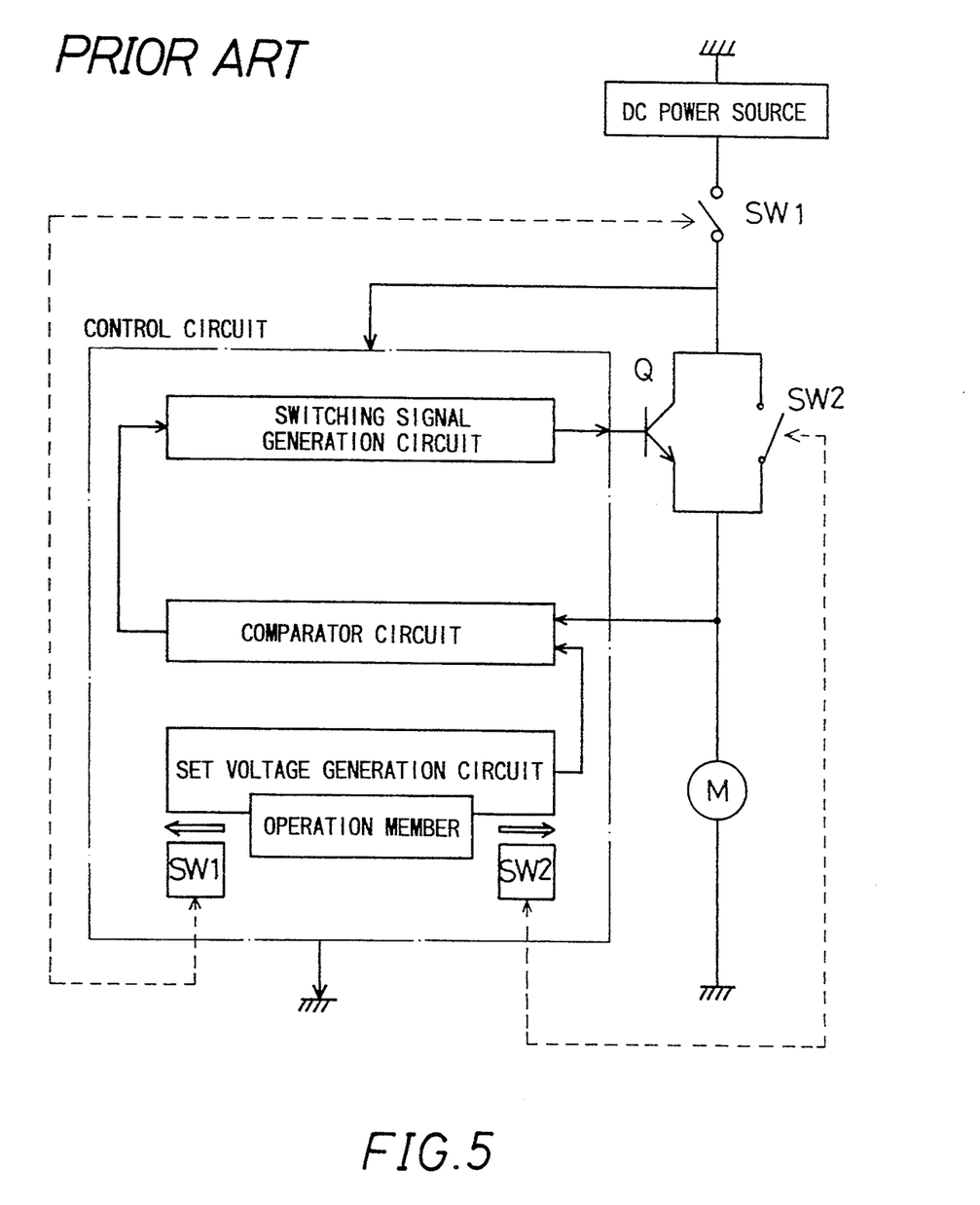
FIG. 5 is a block diagram showing a prior art.

A conventional control device having the above function is shown in FIG. 5. The device includes a DC motor M, a contact switch SW1 for a DC power source, a semiconductor switching element Q which are connected in series with the DC motor M and the DC power source, a second contact switch SW2 arranged to bypass the semiconductor switching element Q, a control circuit connected to the DC power source through the contact switch SW1 so as to control on and off of the semiconductor switching element Q, and an operation member operable by an operator to adjust the rotational speed of the DC motor M.

The contact switch SW1 for the DC power source has such a characteristic that it is turned on when the operation member is operated by a slight amount. The second contact switch SW2 has such a characteristic that it is turned on when the operation member is operated by a substantially maximum operable amount. The control circuit includes a set voltage generation circuit which generates a set voltage corresponding to the amount of operation of the operation member, a comparator circuit which compares a voltage corresponding to a back electromotive force generated in the DC motor M when the semiconductor switching element Q is off, with the set voltage generated by the set voltage generation circuit, and a switching signal generation circuit which generates a switching signal according to the result of comparison in the comparator circuit and which outputs the switching signal to the semiconductor switching element Q.

The control device thus performs a feedback control of the rotational speed of the DC motor M through adjustment of the duty cycle of the semiconductor switching element Q. When the supply of power to the DC motor M is interrupted, the voltage corresponding to the back electromotive force generated in response to the rotational speed of the DC motor is supplied to the comparator circuit. The comparator circuit also receives the set voltage generated by the set voltage generation circuit. Here, the set voltage corresponds to the amount of operation of the operation member.

When the operation member is operated by a certain amount so that the set voltage of a certain value is generated by the set voltage generation circuit, the comparator circuit distinguishes, as the result of comparison, as to whether a lower back electromotive force is generated according to a lower rotational speed of the DC motor M or a higher back electromotive force is generated according to a higher rotational speed of the DC motor. Based on such a result of comparison, the switching signal generation circuit generates the switching signal to increase and decrease the duty cycle when the rotational speed is too low and too high as compared with the amount of operation, respectively. Thus, the feedback control of the duty cycle is performed, so that the rotational speed is adjusted to have a value corresponding to the amount of operation.

Further, if the rotational speed has been reduced because of a load applied to the DC motor M, the duty cycle is increased to compensate for the reduction of the speed. Thus, a control is performed to provide a larger duty cycle as the load increases, so that a feedback control is performed to control the rotational speed with respect to the variation of the load.

If it is required to supply a maximum power to the DC motor M, the duty cycle is adjusted to have a value of 100%. However, because of relatively larger internal resistance in the semiconductor switching element Q, the DC motor may not receive a enough power even if the duty cycle reaches the value of 100%. To solve this problem, the second contact switch SW2 is provided and is closed so as to directly supply the power source voltage to the DC motor M when the maximum power is required to be supplied to the DC motor M.

It is preferable for the second contact switch SW2 to be turned on and off on the condition that the semiconductor switching element Q is kept on or that a substantial potential difference does not exist between contacts of the second contact switch SW2. If not, a spark may be produced between the contacts and therefore, the contacts may be rapidly worn through turning of the second contact switch SW2 on the condition that such a substantial potential difference exists between its contacts. (In fact, because of the internal resistance of the semiconductor switching element Q, a potential difference corresponding to the voltage drop produced by the internal resistance may still exist between the contacts of the second contact switch SW2 even if the semiconductor switching element Q is kept on. However, the subject to be treated in this discussion is the existence of the substantial potential difference which may be produced during off of the semiconductor switching element Q.)

Further, it is preferable for the contact switch SW1 for the DC power source to be turned off on the condition that the semiconductor switching element Q is kept off and that no motor current flows in the DC motor M. Otherwise, the motor current is interrupted by the contact switch SW1, resulting in that a spark is produced between contacts of the contact switch SW1 and that the contacts are rapidly worn. (In case that the contact switch SW1 is turned on, the semiconductor switching element Q is always kept off. Therefore, the on-turning operation of the contact switch SW1 may not cause flow of the motor current.)

Figure 6A:
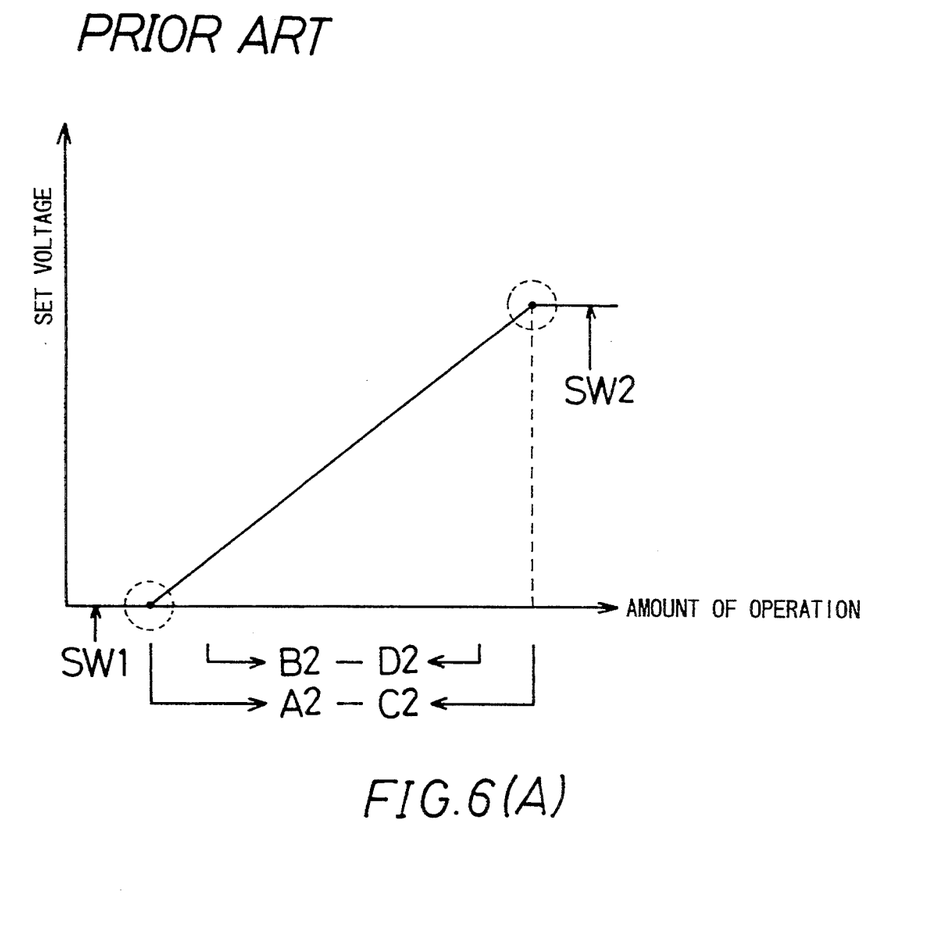
FIGS. 6(A), 6(B) and 6(C) are views showing the operation of the prior art.

To this end, as shown in FIG. 6(A), in the conventional device, the second contact switch SW2 is turned on and off at the time when the operation member is further operated to increase the amount of operation after the set voltage has become to have the maximum value. Further, the contact switch SW1 for the DC power source is turned off at the time when the operation member is further operated to decrease the amount of operation after the set voltage has become to have a minimum value.

If the operation member is intended to be operated by fingers of the operator, the stroke of operation shall be limited as a matter of course. Therefore, it requires to utilize such a limited stroke by the maximum of efficiency.

Figure 6B:
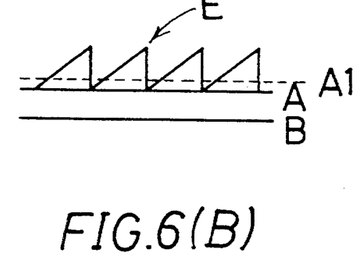

In case that the duty cycle control is performed by utilizing a triangle wave voltage signal as indicated by E in FIG. 6(B), the set voltage corresponding to a slight amount of operation is determined to have a value as indicated by B which is lower enough than the minimum voltage of the triangle wave, so that the duty cycle will reliably have a value of 0% as long as the operation is performed by the slight amount. Thus, the contact switch SW1 for the DC power source may be turned off on the condition that the motor current does not exist. On the other hand, the set voltage corresponding to a substantially maximum amount of operation is determined to have a value indicated by D in FIG. 6(C) which is higher enough than a peak voltage of the triangle wave, so that the duty cycle will reliably have a value of 100% when the amount of operation reaches substantially the maximum value. Thus, the second contact switch SW2 may be turned on and off on the condition that there exists no substantial potential difference between its contacts.

However, with such a determination of the set voltage, the stroke required to vary the duty cycle between 0% and 100% becomes shorter as indicated by B2-D2 in FIG. 6(A). To obtain a longer stroke for variation of the duty cycle between 0% and 100%, the set voltage corresponding to the slight amount of operation may be determined to have a value indicated by A in FIG. 6(B) which is equal to the minimum voltage of the triangle wave. Further, the set voltage corresponding to substantially the maximum amount of operation is determined to have a value indicated by C in FIG. 6(C) which is equal to the peak voltage of the triangle wave. Thus, a longer stroke as indicated by A2-C2 in FIG. 6(A) can be obtained.

In case of the latter determination of the set voltage to obtain the longer stroke, because of variation of voltage of the power source or a battery, the set voltage may have a value indicated by A1 in FIG. 6(B) which is higher than the minimum voltage of the triangle wave even if the operation member is operated by the slight amount. This may result in that the contact switch SW1 is turned off when the motor current exists.

Figure 6C:
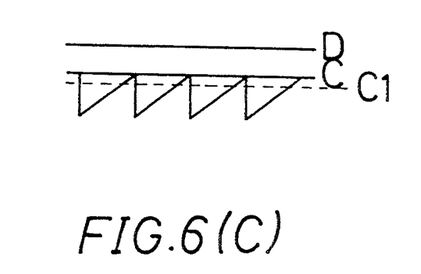

Further, the set voltage may have a value indicated by C1 in FIG. 6(C) which is lower than the peak voltage of the triangle wave. This may result in that the second contact switch SW2 is turned on and off when the semiconductor switching element Q is off and the substantial potential difference exists between the contacts. If this occurs, a spark may be produced when the second contact switch SW2 is turned on and off, and the contacts may be rapidly worn.

SUMMARY OF THE INVENTION

It is, accordingly, an object of the present invention to provide a control device for a DC motor which is operable to prevent a second contact switch SW2 from being turned on and off during off of a semiconductor switching element Q and to prevent a contact switch SW1 for a power source from being turned off during on of the semiconductor switching element Q, while a longer effective stroke is ensured for an operation member.

Figure 1:
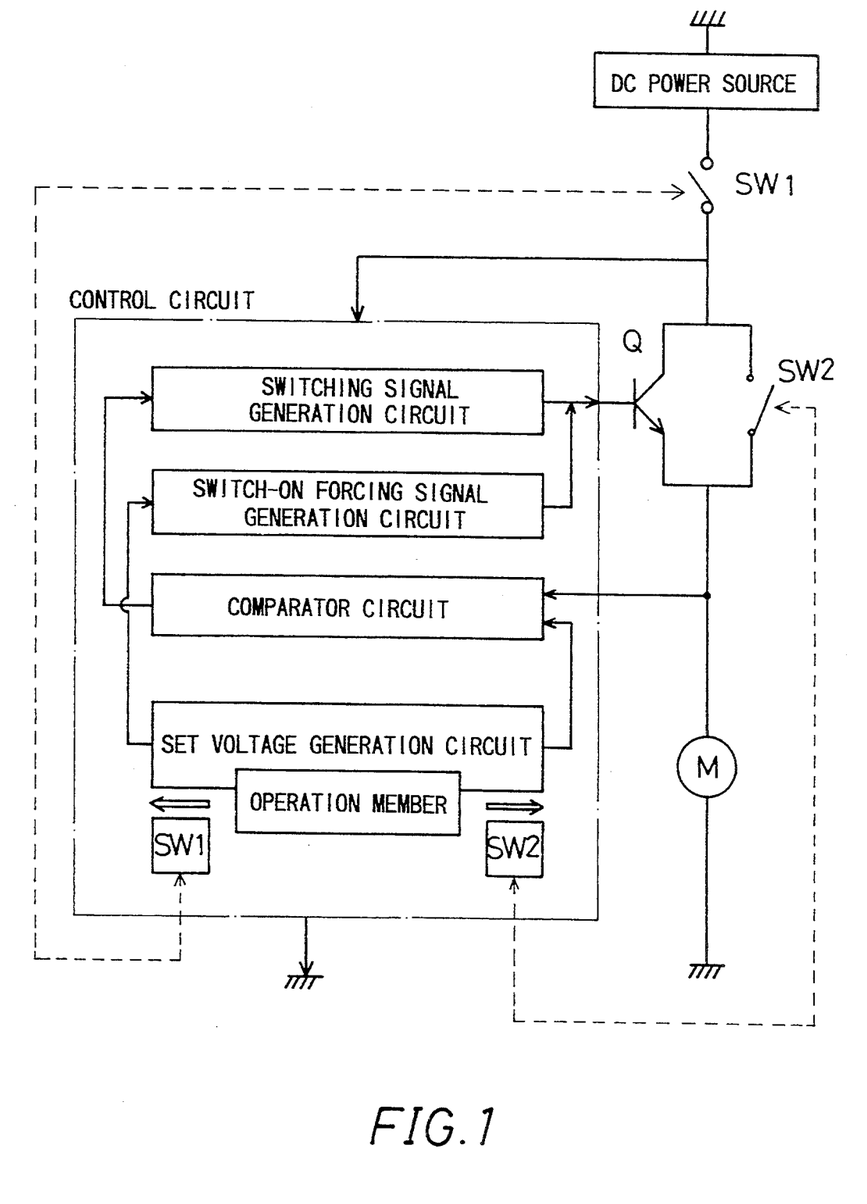
FIG. 1 is a block diagram showing a first aspect of the present invention.

The first aspect of the present invention is to prevent a second contact switch SW2 from being turned on and off during off of a semiconductor switching element Q and to provide a control device for a DC motor which includes, in addition to a conventional construction shown in FIG. 5, a switch-on forcing signal generation circuit shown in FIG. 1 which outputs, to the semiconductor switching element Q, a switch-on forcing signal for switching on the semiconductor switching element Q when a voltage generated by a set voltage generation circuit exceeds a voltage corresponding to an amount of operation of an operation member that is slightly smaller than the amount for turning on the second contact switch SW2.

With this construction, when the amount of operation is increased to reach the value slightly smaller than the value for turning on the second contact switch SW2, the switch-on forcing signal for switching on the semiconductor switching element Q is outputted from the switch-on forcing signal generation circuit, so that the semiconductor switching element Q is forced to be switched on. This ensures turning on and off of the second contact switch SW2 on the condition that the semiconductor switching element Q is kept on.

Figure 2:
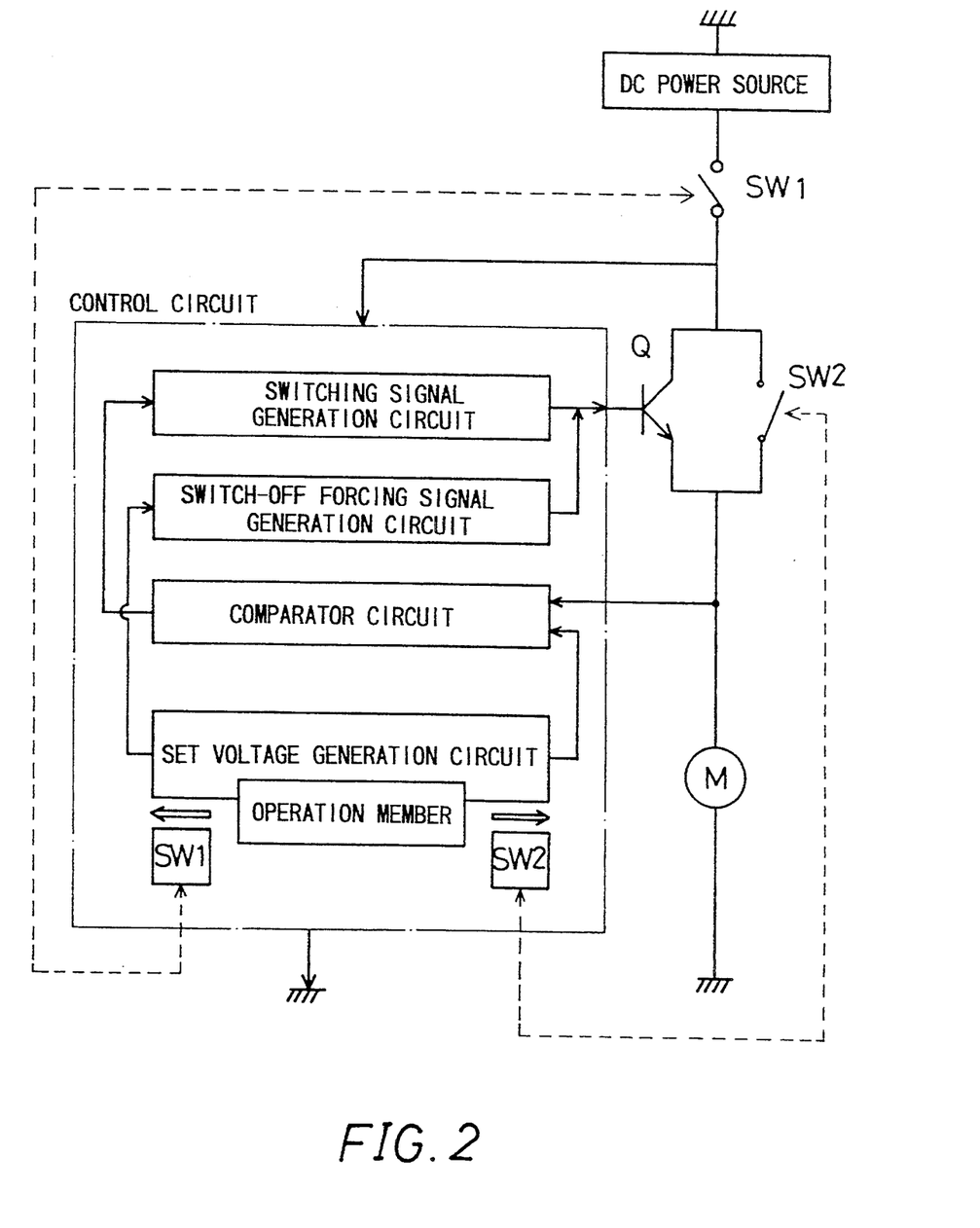
FIG. 2 is a block diagram showing a second aspect of the present invention.

The second aspect of the present invention is to prevent a contact switch SW1 for a power source from being turned off during on of a semiconductor switching element Q and to provide a control device for a DC motor which includes, in addition to a conventional construction shown in FIG. 5, a switch-off forcing signal generation circuit shown in FIG. 2 which outputs, to the semiconductor switching element Q, a switch-off forcing signal for the semiconductor switching element Q when a voltage generated by a set voltage generation circuit becomes lower than a voltage corresponding to an amount of operation of an operation member that is slightly larger than the amount for turning off the contact switch SW1.

With this construction, when the amount of operation is decreased to reach the value slightly larger than the value for turning off the second contact switch, the switch-off forcing signal for the semiconductor switching element Q is outputted from the switch-off forcing signal generation circuit, so that the semiconductor switching element Q is forced to be switched off. This ensures turning off of the contact switch SW1 on the condition that the semiconductor switching element Q is kept off.

The invention will become more apparent from the appended claims and the description as it proceeds in connection with the drawings.

DETAILED DESCRIPTION OF THE PREFERRED EMBODIMENT

An embodiment of the present invention will now be explained with reference to the accompanying drawings.

Figure 3:
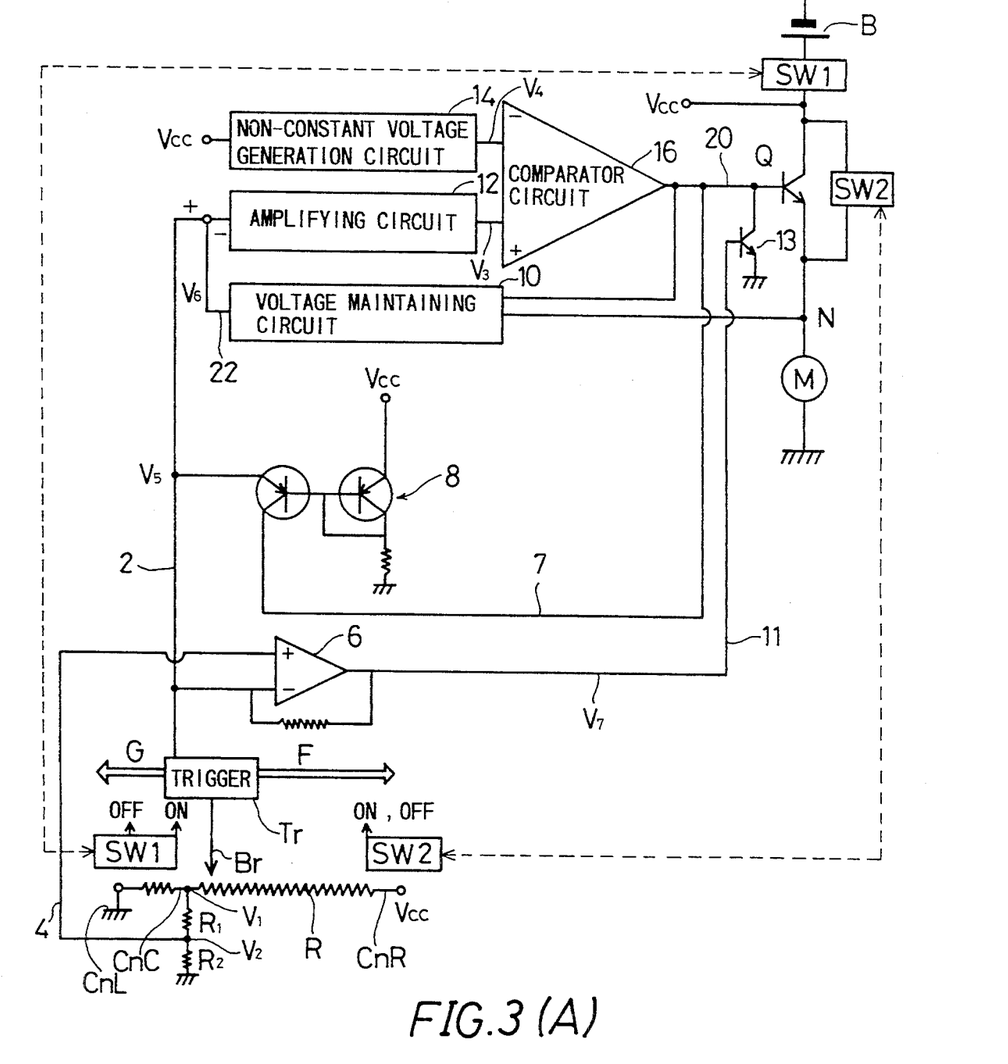
FIGS. 3(A) and 3(B) are views showing circuit configurations of an embodiment of the present invention involving the first and second aspects.

Referring to FIG. 3(A), there is shown a speed control circuit of a speed control device for a DC motor involving the first and second aspects of the present invention. The speed control device is designed to be applied to a power driven tool shown in FIG. 7. Further, the speed control device is mounted on the tool within an area defined by a dotted line in FIG. 7, so that it has a compact construction.

The speed control circuit includes a first contact switch SW1 for a battery B (DC power source) and a semiconductor switching element Q which are connected in series with a DC motor M and the battery B. A second contact switch SW2 is connected in parallel with the semiconductor switching element Q so as to bypass the semiconductor switching element Q. A power source voltage Vcc is drawn from the downstream of the contact switch SW1. The speed control circuit will now be described in more detail.

Figure 4:
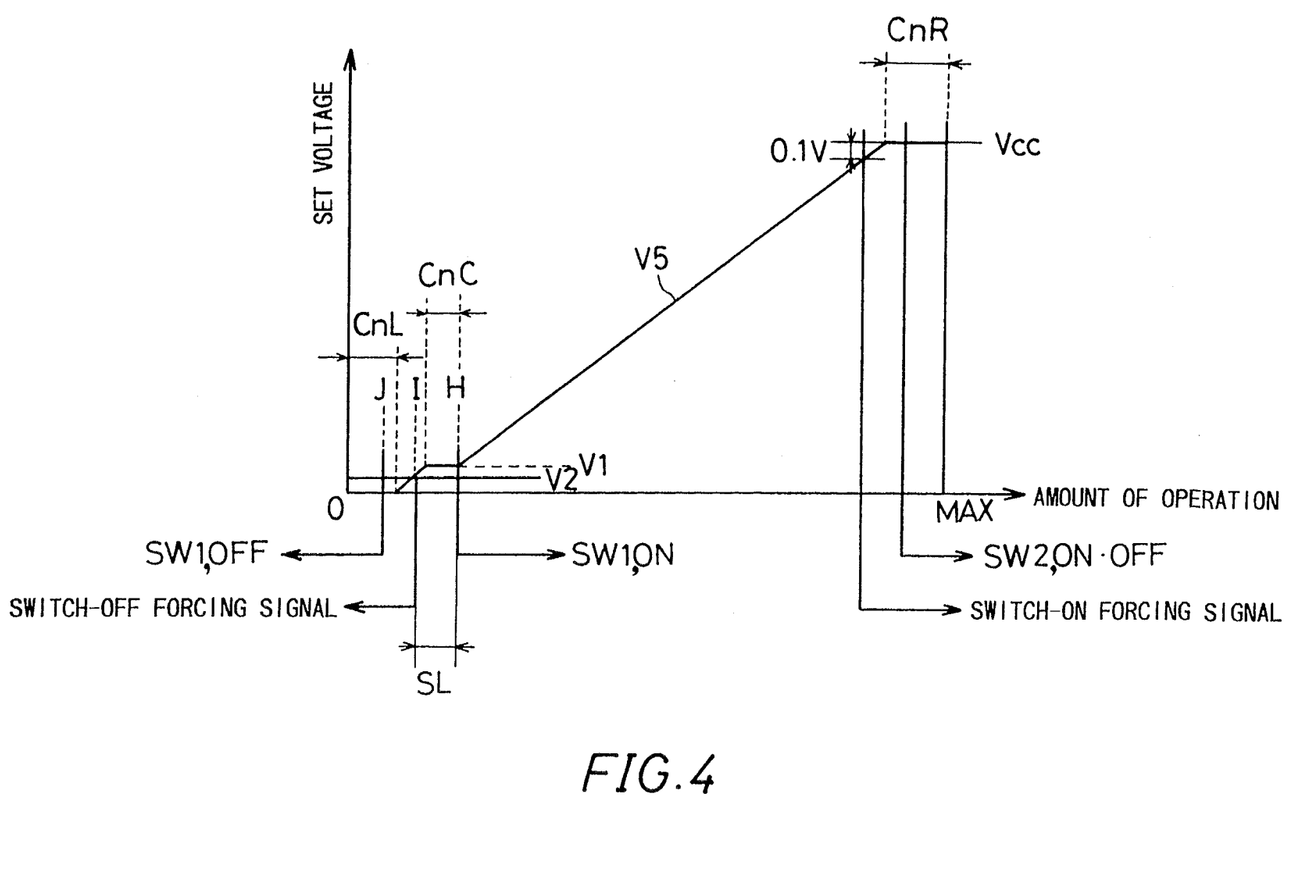
FIG. 4, is a graph showing an operation of the embodiment.
Figure 7:
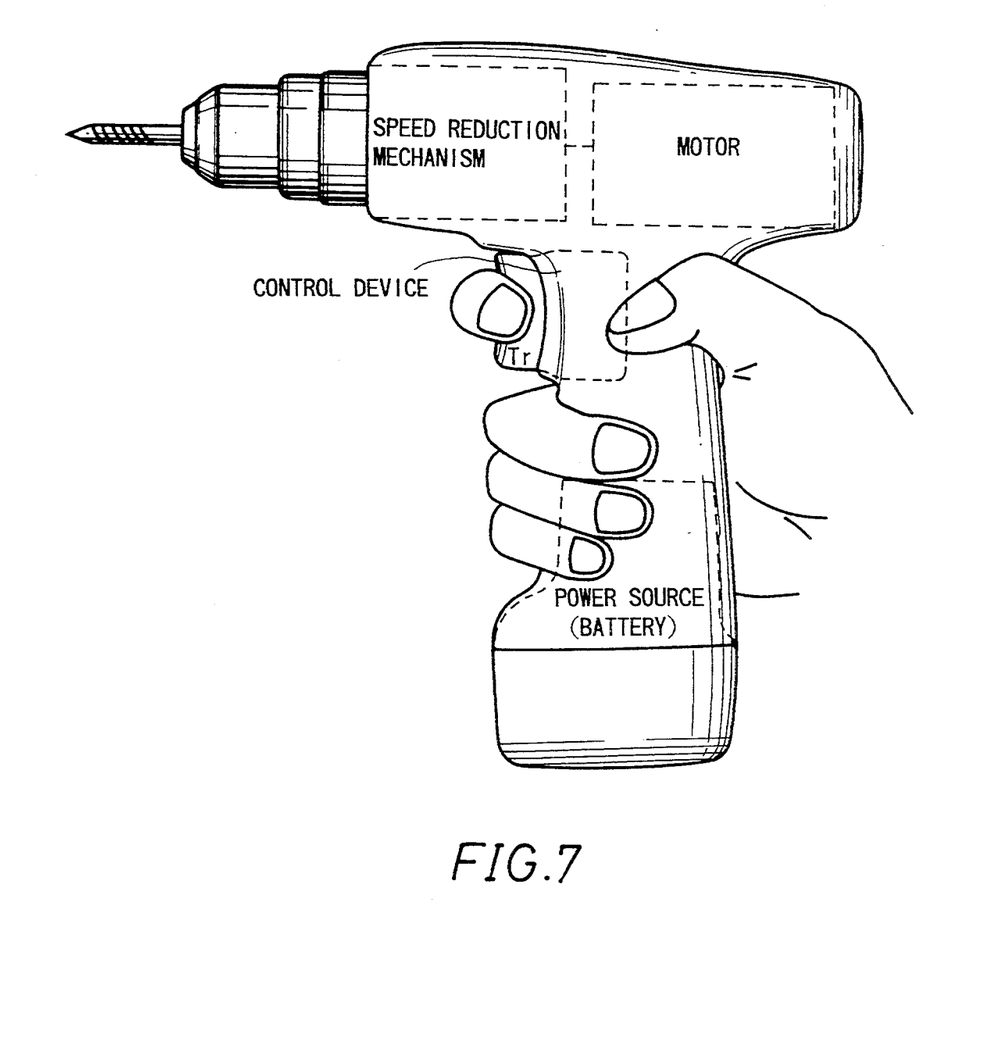
FIG. 7 is a view showing an example of an application of the embodiment.

A trigger Tr is operable by fingers of an operator as shown in FIG. 7. The trigger Tr is normally biased by a spring (not shown) in a direction indicated by an arrow G in FIG. 3(A), and is slidably movable by the fingers in a direction indicated by an arrow F against the biasing force of the spring. A brush Br is fixedly mounted on the trigger Tr and is slidably movable along a resistor R. As shown in a paste of a resistance material is printed. Three conductor membranes CnL, CnC and CnR are disposed between the resistor R and the base plate Ba. The conductor membrane CnR positioned on the right side receives the power source voltage Vcc for a control purpose. The conductor membrane CnL positioned on the left side is grounded. The conductor membrane CnC centrally positioned is connected to resistors R1 and R2 which serve to divide a voltage V1 at the conductor membrane CnC so as to obtain a voltage V2. The voltage V2 is supplied to a lead pattern 4 as will be described later. The voltage distribution on the resistor R is shown in FIG. 4. A voltage V5 at the brush Br is supplied to a lead pattern 2 as will be also described later.

A voltage maintaining circuit 10 supplies a voltage at a connecting point N of the DC motor M to an output line 22 during the time when an off signal is transmitted to the base of the semiconductor switching element Q via a lead pattern 20. During the time when an on signal is transmitted to the base, the voltage maintaining circuit 10 maintains the voltage at the connecting point N produced at the time when the off signal is turned. Thus, the voltage maintaining circuit 10 outputs, to the output line 22, a voltage V6 corresponding to a back electromotive force of the DC motor M which is generated during interruption of supply of power.

An amplifying circuit 12 receives a voltage corresponding to a subtraction of the voltage V6 from the voltage V5 at the brush Br. The brush voltage V5 increases as the amount of operation of the trigger Tr increases. Further, the voltage V6 corresponding to the back electromotive force increases as the rotational speed of the DC motor M increases. Since the voltage to be received by the amplifying circuit 12 is a subtraction of the voltage V6 from the voltage V5, a larger voltage is supplied to the amplifying circuit 12 as the trigger Tr is operated by a larger amount and as the DC motor M is rotated at a lower speed, while a smaller voltage is supplied to the amplifying circuit 12 as the trigger Tr is operated by a smaller amount and as the DC motor M is rotated at a higher speed.

A non-constant voltage generation circuit 14 generates a triangle wave E of a voltage V4 as described in connection with FIG. 6. A comparator circuit 16 compares the voltage V4 with an amplified voltage V3 from the amplifying circuit 12 and outputs a switching signal to switch on the semiconductor switching element Q during the time when the amplified voltage V3 exceeds the triangle wave voltage V4. The time of existence of the relationship V3>V4 increases as the amplified voltage V3 increases because of a greater amount of operation of the trigger Tr and because of a lower rotational speed of the DC motor M as described above. In this case, the duty cycle is increased. The time of existence of the relationship V3>V4 decreases as the amplified voltage V3 is decreased because of a smaller amount of operation of the trigger Tr and because of a higher rotational speed of the DC motor M. In this case, the duty cycle is decreased. This means that a feedback control is performed to control the rotational speed of the DC motor M to have a value corresponding to the amount of operation of the trigger Tr, irrespective of the load applied to the motor M.

The brush voltage V5 and the power source voltage Vcc for control purpose are supplied to a current mirror circuit 8. The current mirror circuit 8 is operable to supply a current or a switch-on forcing signal to the base of the semiconductor switching element Q via a lead pattern 7 so as to switch on the semiconductor switching element Q when the relationship $Vcc - V5 \leq 0.1$ (volt) exists. On the other hand, the current mirror circuit 8 is operable to supply no current to the lead pattern 7 when the relationship $Vcc - V5 > 0.1$ (volt) exists. Thus, the semiconductor switching element Q is forced to be switched on when the relationship $Vcc - V5 \leq 0.1$ (volt) exists. Here, the second contact switch SW2 is determined to be turned on and off with reference to a position of the right side conductor membrane CnR shown in FIGS. 3(B) and 4. Since the second contact switch SW2 is turned on and off when the brush voltage V5 reaches its maximum value or the power source voltage Vcc as shown in FIG.4, the current mirror circuit 8 forces to switch on the semiconductor switching element Q when the brush voltage V5 reaches a value lower than the voltage Vcc for turning on of the second contact switch SW2 by 0.1 (volt). This value of voltage is appeared in the brush Br when the trigger Tr is operated by a stroke slightly smaller than a stroke for turning on of the second contact switch SW2.

A switch-on forcing signal generation circuit is therefore constructed by the current mirror circuit 8 and the lead pattern 7 which applies the switch-on forcing signal to the base of the semiconductor switching element Q.

A switch-off forcing signal generation circuit will now be explained. This circuit includes a comparator circuit 6 which compares the divided voltage V2 with the brush voltage V5 and outputs an on-signal to provide a voltage V7 in a lead pattern 11 when the relationship V2>V5 exists. The voltage V7 is supplied to the base of a second semiconductor switching element 13 which bypasses the switching signal for the semiconductor switching element Q, so that the switching signal for switching on is forced to be grounded or the second semiconductor switching element 13 outputs a switch-off forcing signal when the relationship V2>V5 exists. Thus, the semiconductor switching element Q is forced to be switched off.

The condition for the relationship V2>V5 will now be explained with reference to FIG. 4. As will be seen from FIG. 4, the relationship V2>V5 is obtained when the brush Br is positioned on the left side part of a central portion of a space between the left side conductor membrane CnL and the central conductor membrane CnC in FIG. 3(B).

As for the contact switch SW1 for the power source, it is turned from off to on when the brush Br is moved rightwardly from the right side end of the central conductor membrane CnC. On the other hand, because of a predetermined play or a hysteresis in the contact switch SW1, the contact switch SW1 turns from on to off when the brush Br is moved leftwardly from the right side end of the left conductor membrane CnL. Therefore, the position to turn on and that to turn off do not coincide with each other, and the position for generation of the switch-off forcing signal in the switch-off forcing signal generation circuit is positioned between the positions for turning on and off of the contact switch SW1.

The operation derived from such a positional relationship will now be explained. As the trigger Tr is started to be moved for driving the power driven tool, the first contact switch SW1 for the power source is turned on when the stroke of the trigger Tr reaches Stroke H (see FIG. 4). At this moment, since no power is supplied to the control circuit, the semiconductor switching element Q is not as yet switched on and no current flows in the DC motor M irrespective of turning on of the first contact switch SW1. However, as soon as the trigger Tr reaches Stroke H, the brush voltage V5 or the set voltage has a value which may provide the duty cycle in excess of 0%. Therefore, the DC motor M is started after a very short time from turning on of the first contact switch SW1, and the rotational speed is increased as the trigger Tr is further operated to increase the brush voltage V5.

In case that the power driven tool shown in FIG. 7 is used to precisely machine a work, the operator moves the trigger Tr by a small amount so as to drive the DC motor M at a lower speed, with reference to Stroke H where the DC motor M is started to rotate. During such operation, the force of fingers of the operator to pull the trigger Tr may be loosened for some reason or other. It is inconvenient for the operator to machine the work if the DC motor M is stopped for each time of loosening of the force. In case of this embodiment, the switch-off forcing signal generation circuit for the semiconductor switching element Q may not be operated to generate the switch-off forcing signal unless the stroke is reduced less than Stroke I where the relationship V2=V5 is presented. Further, the first contact switch SW1 may not be turned off in case that the stroke is more than Stroke I. Thus, a play SL exists between Stroke H and Stroke I, so that the DC motor M is kept to be rotated at a lower speed during the stroke within the play SL. This may substantially facilitate the low speed machining operation.

As described above, the switch-off forcing signal generation circuit is constructed by the comparator circuit 6 and the second semiconductor switching element 13 and is operable to switch off the semiconductor switching element Q if the relationship V2>V5 exists. Here, the relationship V2>V5 is presented when the amount of operation of the trigger Tr reaches the amount (Stroke I) which is slightly larger than the amount (Stroke J) for turning off the first contact switch SW1.

Although, with the above embodiment, the on/off signal outputted from the comparator circuit 16 is forced to be converted, the input voltage supplied to the comparator circuit 16 may be adjusted to control the on/off signal for the semiconductor switching element Q. For example, the output of the current mirror circuit 8 may be added to the brush voltage V5 so as to normally provide the relationship V3>V4, so that the semiconductor switching element Q is forced to be switched on. In the same manner therewith, the output of the comparator circuit 6 may be added to the nonconstant voltage V4 so as to normally provide the relationship V3<V4, so that the semiconductor switching element Q is forced to be switched off.

Further, the circuit configuration as shown in FIG. 3(A) to compare the non-constant voltage V4, the brush voltage V5 and the voltage V6 corresponding to the back electromotive force with each other is illustrated only an example, and any other circuit configuration for performing such a comparison can be incorporated to obtain the same feedback operation. The applicant's co-pending patent application Ser. No. 977,632 discloses such a circuit configuration.

According to the present invention, the semiconductor switching element Q is forced to be switched on immediately before turning on of the second contact switch SW2. Therefore, the second contact switch SW2 can be turned on and off on the condition that no potential difference exists between its contacts.

Further, according to the present invention, the contact switch SW1 for the power source is turned off on the condition that the semiconductor switching element Q is off and that no current flows in the DC motor M. Therefore, the contact switch SW1 does not interrupt a larger motor current.

Consequently, for both the contact switches SW1 and SW2, the production of a spark at the contacts or the earlier wear of the contacts is prevented, so that the durability of the contact switches SW1 and SW2 is considerably improved.

While the invention has been described with reference to a preferred embodiment, it is to be understood that modifications or variation may be easily made without departing from the spirit of this invention which is defined by the appended claims.

What is claimed is:

1. In a speed control device for a DC motor, comprising:
    a power source contact switch SW1 and a semiconductor switching element Q connected in series with the DC motor and a DC power source;
    a second contact switch SW2 arranged to bypass said semiconductor switching element Q;
    a control circuit connected to said power source via said power source contact switch SW1 for controlling on and off of said semiconductor switching element Q; and
    an operation member operable by an operator to adjust the rotational speed of said DC motor;
    said power source contact switch SW1 having a control such that said power source contact switch SW1 is turned on when said operation member is operated by a first amount;
    said second contact switch SW2 having a control such that said second contact switch SW2 is turned on when said operation member is operated by a second amount wherein said second amount is substantially greater than said first amount;
    said control circuit including a set voltage generation circuit to generate a first set voltage corresponding to the amount of operation of said operation member when said operation member operates by said first amount and a second set voltage corresponding to the amount of operation of said operation member when said operation member operates by said second amount, a comparator circuit comparing a voltage corresponding to a back electromotive force generated during off of said semiconductor switching element Q, with at least one of said set voltages generated by said set voltage generation circuit, and a switching signal generation circuit generating a switching signal based on a result of the comparison in said comparator circuit and outputting said switching signal to said semiconductor switching element Q;

the improvement including a switch-on forcing signal generation circuit which outputs, to said semiconductor switching element Q, a switch-on forcing signal to switch on said semiconductor switching element Q when said first set voltage generated in said set voltage generation circuit exceeds a third voltage corresponding to a predetermined amount of operation of said operation member that is less than the second amount for turning on of said second contact switch SW2.

2. The speed control device as defined in claim 1 wherein said switch-on forcing signal generation circuit includes a current mirror circuit which receives a voltage Vcc from a power source for control purpose and also receives at least one said set voltage, and outputs said switch-on forcing signal to the base of said semiconductor switching element Q.

3. In a speed control device for a DC motor, comprising:
a power source contact switch SW1 and a semiconductor switching element Q connected in series with the DC motor and a DC power source;
a second contact switch SW2 arranged to bypass said semiconductor switching element Q;
a control circuit connected to said power source via said power source contact switch SW1 for controlling on and off of said semiconductor switching element Q; and
an operation member operable by an operator to adjust the rotational speed of said DC motor;
said power source contact switch SW1 having a control such that said power source contact switch SW1 is turned on when said operation member is operated by a first amount;
said second contact switch SW2 having a control such that said second contact switch SW2 is turned on when said operation member is operated by a second amount wherein said second amount is substantially greater than said first amount;
said control circuit including a set voltage generation circuit to generate a first set voltage corresponding to the amount of operation of said operation member when said operation member operates by said first amount and a second set voltage corresponding to the amount of operation of said operation member when said operation member operates by said second amount, a comparator circuit comparing a voltage corresponding to a back electromotive force generated during off of said semiconductor switching element Q, with at least one of said set voltages generated by said set voltage generation circuit, and a switching signal generation circuit generating a switching signal based on a result of the comparison in said comparator circuit and outputting said switching signal to said semiconductor switching element Q;

the improvement including a switch-off forcing signal generation circuit which outputs, to said semiconductor switching element Q, a switch-off forcing signal to switch off said semiconductor switching element Q when said second set voltage generated in said set voltage generation circuit becomes less than a fourth voltage corresponding to a predetermined amount of operation of said operation member that is greater than the first amount for turning off of said power source contact switch SW1.

4. The speed control device as defined in claim 3 wherein the amount of operation of said operation member for turning on of said contact switch SW1 is determined to have a larger value than that for outputting said switch-off forcing signal from said switch-off forcing signal generation circuit to said semiconductor switching element Q.

5. The speed control device as defined in claim 3 wherein said switch-off forcing signal generation circuit includes a second switching element arranged to bypass said switching signal, and includes a second comparator circuit which is connected to the base of said second switching element.

6. In a speed control device for a DC motor, comprising:
a power source contact switch SW1 and a semiconductor switching element Q connected in series with the DC motor and a DC power source;
a second contact switch SW2 arranged to bypass said semiconductor switching element Q;
a control circuit connected to said power source via said power source contact switch SW1 for controlling on and off of said semiconductor switching element Q; and
an operation member operable by an operator to adjust the rotational speed of said DC motor;
said power source contact switch SW1 having a control such that said power source contact switch SW1 is turned on when said operation member is operated by a first amount;
said second contact switch SW2 having a control such that said second contact switch SW2 is turned on when said operation member is operated by a second amount wherein said second amount is substantially greater than said first amount;
said control circuit including a set voltage generation circuit to generate a first set voltage corresponding to the amount of operation of said operation member when said operation member operates by said slight amount and a second set voltage corresponding to the amount of operation of said operation member when said operation member operates by said maximum amount, a comparator circuit comparing a voltage corresponding to a back electromotive force generated during off of said semiconductor switching element Q, with at least one of said set voltages generated by said set voltage generation circuit, and a switching signal generation circuit generating a switching signal based on a result of the comparison in said comparator circuit and outputting said switching signal to said semiconductor switching element Q;
the improvement including:
a switch-on forcing signal generation circuit which outputs, to said semiconductor switching element Q, a switch-on forcing signal to switch on said semiconductor switching element Q when said first set voltage generated in said set voltage generation circuit exceeds a third voltage corresponding to a predetermined amount of operation of said operation member that is less than the second amount for turning on of said second contact switch SW2; and a switch-off forcing signal generation circuit which outputs, to said semiconductor switching element Q, a switch-off forcing signal to switch off said semiconductor switching element Q when said second set voltage generated in said set voltage generation circuit becomes less than a fourth voltage corresponding to a predetermined amount of operation of said operation member that is greater than the first amount for turning off of said power source contact switch SW1.

7. The speed control device as defined in claim 6 wherein the amount of operation of said operation member for turning on of said contact switch SW1 is determined to have a larger value than that for outputting said switch-off forcing signal from said switch-off forcing signal generation circuit to said semiconductor switching element Q.

8. The speed control device as defined in claim 6 wherein said set voltage generation circuit includes a resistor, a brush movable along said resistor and three conductors connected to said resistor, one of said conductors receiving a voltage Vcc from a power source and the other being grounded.

* * * * *